United States Patent
Korus et al.

(10) Patent No.: US 11,242,947 B2
(45) Date of Patent: *Feb. 8, 2022

(54) IRRIGATION PIPE ASSEMBLY

(71) Applicant: Lindsay Corporation, Omaha, NE (US)

(72) Inventors: Thomas J. Korus, Lindsay, NE (US); Charles H. Meis, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 99 days.

This patent is subject to a terminal disclaimer.

(21) Appl. No.: 16/861,336

(22) Filed: Apr. 29, 2020

(65) Prior Publication Data

US 2020/0256489 A1 Aug. 13, 2020

Related U.S. Application Data

(60) Continuation of application No. 14/943,636, filed on Nov. 17, 2015, now Pat. No. 10,690,274, which is a
(Continued)

(51) Int. Cl.
| | |
|---|---|
| *F16L 23/028* | (2006.01) |
| *A01G 25/02* | (2006.01) |
| *F16L 23/032* | (2006.01) |
| *A01G 25/00* | (2006.01) |
| *A01G 25/09* | (2006.01) |

(Continued)

(52) U.S. Cl.
CPC .......... *F16L 23/0283* (2013.01); *A01G 25/02* (2013.01); *F16L 23/0286* (2013.01); *F16L 23/032* (2013.01); *A01G 25/00* (2013.01); *A01G 25/09* (2013.01); *F16L 3/1016* (2013.01); *F16L 23/08* (2013.01); *F16L 23/125* (2013.01); *F16L 58/02* (2013.01); *F16L 58/04* (2013.01); *F16L 58/187* (2013.01); *Y10T 29/494* (2015.01); *Y10T 137/8593* (2015.04)

(58) Field of Classification Search
CPC ........ A01G 25/02; A01G 25/09; A01G 25/00; F16L 23/125; F16L 58/02; F16L 58/04; F16L 58/187; F16L 23/08; F16L 23/032; F16L 3/1016; Y10T 137/8593; Y10T 29/494
See application file for complete search history.

(56) References Cited

U.S. PATENT DOCUMENTS 2,766,996 A * 10/1956 Jacoby ................... A01G 25/09
 285/5
2,892,466 A * 6/1959 Stilwell ................... F16L 55/00
 239/737
(Continued)

*Primary Examiner* — Rick K Chang
(74) *Attorney, Agent, or Firm* — Hovey Williams LLP

(57) ABSTRACT

An irrigation pipe assembly that utilizes a pipe that is made of a durable material, e.g., stainless steel or aluminum. During fabrication, the pipe is equipped with a plurality of components, i.e., a flange assembly, a truss mount, and an outlet, without drilling, welding, or the like. In this manner, a method of fabrication is provided that enables a plurality of components to be assembled to the pipe without compromising the integrity of the pipe material or treated surface so that galvanizing or painting is not required after the plurality of components have been fitted to the pipe.

20 Claims, 5 Drawing Sheets

Related U.S. Application Data division of application No. 13/043,148, filed on Mar. 8, 2011, now Pat. No. 9,279,520.

(60) Provisional application No. 61/326,423, filed on Apr. 21, 2010.

(51) Int. Cl.
| | |
|---|---|
| *F16L 3/10* | (2006.01) |
| *F16L 23/08* | (2006.01) |
| *F16L 23/12* | (2006.01) |
| *F16L 58/02* | (2006.01) |
| *F16L 58/18* | (2006.01) |
| *F16L 58/04* | (2006.01) |

(56) References Cited

U.S. PATENT DOCUMENTS

| | | | | |
|---|---|---|---|---|
| 2,896,858 | A * | 7/1959 | Joels | A01G 25/09 239/726 |
| 2,990,121 | A * | 6/1961 | Fischer | A01G 25/09 239/732 |
| 3,057,559 | A * | 10/1962 | Ingram | A01G 25/09 239/732 |
| 3,164,360 | A * | 1/1965 | Stafford | A01G 25/00 251/146 |
| 3,179,340 | A * | 4/1965 | Sylvan | A01G 25/09 239/741 |
| 3,217,737 | A * | 11/1965 | Jensen | A01G 25/09 239/741 |
| 3,324,876 | A * | 6/1967 | Morgan | A01G 25/09 239/732 |
| RE26,285 | E * | 10/1967 | Stafford | A01G 25/09 239/735 |
| 3,516,609 | A * | 6/1970 | Gheen | A01G 25/09 239/734 |
| 3,528,634 | A * | 9/1970 | Jenkins | F16L 3/16 248/70 |
| 3,807,585 | A * | 4/1974 | Holzmann | B60P 3/41 414/529 |
| 3,807,638 | A * | 4/1974 | Clements | A01G 25/09 239/734 |
| 3,856,039 | A * | 12/1974 | Courtright | B05B 15/60 239/741 |
| 3,870,235 | A * | 3/1975 | Newell | A01G 25/09 239/728 |
| 3,976,093 | A * | 8/1976 | Cornelius | A01G 25/09 239/741 |
| 4,076,039 | A * | 2/1978 | Hartsock | A01G 25/09 239/737 |
| 4,135,738 | A * | 1/1979 | Clements | F16L 27/087 239/734 |
| 7,407,182 | B2 * | 8/2008 | Aoki | B60R 21/201 280/728.1 |
| 8,882,006 | B2 * | 11/2014 | Korus | A01G 25/097 239/732 |
| 8,998,162 | B1 * | 4/2015 | Gutha | A01G 25/09 248/545 |

* cited by examiner

IRRIGATION PIPE ASSEMBLY

CROSS-REFERENCE TO RELATED APPLICATIONS

This patent application is a continuation application of US patent application titled IRRIGATION PIPE AND METHOD OF FABRICATION, Ser. No. 14/943,636, filed Nov. 17, 2015. Application Ser. No. 14/943,636 is a divisional application of US patent application titled IRRIGATION PIPE AND METHOD OF FABRICATION, Ser. No. 13/043,148, filed Mar. 8, 2011, issued as U.S. Pat. No. 9,279,520 Mar. 8, 2016. Application Ser. No. 13/043,148 claims priority to U.S. Provisional Patent Application Ser. No. 61/326,423, filed Apr. 21, 2010. The above-referenced patent applications and patent are hereby incorporated by reference in their entireties into the present application.

BACKGROUND

The present invention relates generally to irrigation pipes and methods of fabrication of the same. More specifically, embodiments of the present invention concern an irrigation pipe and method of fabrication that is particularly suitable for use with an irrigation system in an agricultural environment.

DISCUSSION OF PRIOR ART

Crops are cultivated throughout the world in a wide variety of climates with different terrains and soils. It is desirable in many of these climates to artificially supplement the climate's natural precipitation via irrigation systems to ensure crops receive adequate water. Additionally, irrigation systems can be used to deliver fertilizers and chemicals to, among other things, promote healthy crop growth, suppress weeds, and protect crops from frost.

Common irrigation systems for use with crops cultivated in fields include overhead irrigation systems. In such systems, water may be hose-fed and/or pipe-fed to one or more "hydrants" located centrally within or adjacent to a field. Alternatively, water may be ditch-fed by routing water into a ditch that runs along and/or through a field.

The hydrants or ditches are connected by a hose to an overhead high-pressure sprinkler network, which includes an elongated irrigation pipe that is elevated and supported by a plurality of trusses. The irrigation pipe includes a plurality of sprinklers spaced generally along an entire length of the irrigation pipe and may extend downward to within approximately three ft. of the crops to enable distribution of water to the crops from above. The number of trusses and sprinklers are determined by the length of the irrigation pipe.

The irrigation pipe is generally employed in one of two overhead sprinkler network types, that is, center-pivot systems and lateral-move systems.

Center-pivot systems are ideal for use in fields having circular crop areas and generally include a hydrant located in the middle of each circular crop area. In such systems, an elevated, elongated irrigation pipe with sprinklers extends from a hydrant to an outer circumference of the circular crop area such that the systems may be driven in a circular pattern over the crops to deliver water thereto during rotation.

Lateral-move systems are ideal for use in square, rectangular, and irregular-shaped fields, for example, "L" shaped fields. Such systems generally include one or more hydrants located in and/or adjacent to a field and/or one or more ditches located along or through a field that are connected to an elevated, elongated irrigation pipe with sprinklers. Unlike the center-pivot system having an irrigation pipe with a stationary end, the irrigation pipe in a lateral-move system is connected to and extends from a movable cart designed to traverse up and down a cart path. The irrigation pipe may be locked at an angle perpendicular to the cart path and pivot at an end at the cart path, which is desirable if the cart path extends down the middle of a field to enable pivoting from one side of the cart path to the other with each pass along the cart path.

Conventional irrigation pipes are fabricated from carbon steel and then equipped with various components, for example, mounts to permit secure elevation of the irrigation pipe and connectors to connect sections of the irrigation pipe. The various components are traditionally assembled onto the irrigation pipe via drilling and welding. After the various components have been assembled onto the irrigation pipe, it is necessary for the irrigation pipe to be galvanized or painted to seal the surface of the irrigation pipe and to prevent rusting.

The processes of welding and galvanizing or painting requires additional manipulation and processing of the irrigation pipe, which is time consuming and labor intensive, particularly for irrigation pipes that span hundreds of feet. Furthermore, the processes of welding, galvanizing, and painting are imprecise processes that require undesirable large tolerances in manufacturing specifications that adversely affect secure, sealing engagement of mating parts of the irrigation pipe.

SUMMARY

The following brief summary is provided to indicate the nature of the subject matter disclosed herein. While certain aspects of the present invention are described below, the summary is not intended to limit the scope of the present invention.

Embodiments of the present invention provide an irrigation pipe and method of fabrication that does not suffer from the problems and limitations of conventional irrigation pipes and their methods of fabrication such as those set forth above.

The present invention provides, in its simplest form, a fluid transmission or irrigation pipe and method of fabrication that utilizes a pipe made of a durable material, e.g., stainless steel, aluminum, or a composite material. During fabrication, the pipe is equipped with a plurality of components, i.e., a flange assembly, a truss mount, and an outlet, using a method that does not require drilling, welding, or like processes. In this manner, the plurality of components are assembled to the pipe without compromising the integrity of the pipe so that galvanizing or painting is not required after the plurality of components have been fitted to the pipe.

The aforementioned aspects may be achieved by providing an irrigation pipe assembly having a liquid conduit for the delivery of liquid, the assembly including a pipe section that may be operable to provide a portion of the liquid conduit, an outlet on a surface of the pipe section having a first end on the interior side of the pipe section and a second end on the exterior side of the pipe section, the first end of the outlet spaced from the surface of the pipe section, and a mount assembly operable to provide at least one point of attachment on the pipe section, the mount assembly having a bracket with an abutment region and a spaced region between the bracket and the mount assembly.

The irrigation pipe assembly may further include a socket in the pipe section that may be operable to house the outlet such that the outlet is flush or is substantially flush with the surface of the pipe section. The outlet may include opposing inner and outer convex walls, the inner convex wall conforming to the contour of the socket, and the outer convex wall conforming to the contour of the surface of the pipe section. The outlet may include an external ring that (i) divides the first end of the outlet from the second end of the outlet, and (ii) abuts the surface of the pipe section. The outlet includes smooth and threaded portions between the external ring and the first end, the threaded portion operable to secure the outlet on the surface of the pipe section, and the smooth portion operable to space the first end of the outlet from the surface of the pipe section.

The aforementioned aspects may also be achieved by providing an irrigation pipe assembly having a liquid conduit for the delivery of liquid, the assembly including a plurality of pipe sections that may be operable to provide a portion of the liquid conduit and a flange having a flange plate at opposing ends of each pipe section, the flange plate having an abutment surface with a plurality of apertures and a circumferential groove therein, the abutment surface may be operable to abut the flange and receive a portion of the flange therein. The flange plates may be operable to be secured together via fasteners that extend through the plurality of apertures such that the flanges of the pipe sections are substantially enclosed and the plurality of pipe sections are secured together. The flange plates may be operable to space ends of the fasteners from the flanges of the pipe sections.

The aforementioned aspects may also be achieved by providing an irrigation pipe assembly having a liquid conduit for the delivery of liquid, the assembly including a pipe section that may be operable to provide a portion of the liquid conduit, and a support-attachment assembly that may be operable to provide at least one point of attachment on the pipe section. The mount assembly may have a bracket with an abutment region and a spaced region between the bracket and the mount assembly. The bracket may have depending arms with projections that each extend inwardly and upwardly to engage the pipe section at an abutment region on the pipe section. The abutment region on the pipe section may be a notch in the surface of the pipe section that receives the projection therein. In some embodiments, the irrigation pipe assembly may include another bracket fastened to the depending arms of the upper bracket via fasteners that partially extend into the spaced region between the pipe section and the mount assembly.

The aforementioned aspects may also be achieved by providing a method of fabricating an irrigation pipe having a liquid conduit for the delivery of liquid, the method including the steps of forming a portion of the liquid conduit by connecting a plurality of pipe sections having opposing flanges, securing the plurality of pipes together by the flanges via a flange plate assembly, forming a socket in the plurality of pipe sections; and enclosing a portion of the plurality of pipe sections via a mount assembly that may be operable to provide at least one point of attachment on the pipe section. The flange plate assembly may include opposing flange plates, each flange plate having an abutment surface with a plurality of apertures and a circumferential groove therein, the abutment surface may be operable to abut one of the flanges and receive a portion of the one of the flanges therein. The flange plate assembly may substantially enclose the flanges.

In some embodiments, the method may further comprise the steps of fastening the flange plate assembly together via fasteners, spacing ends of the fasteners from the flanges via the flange plate assembly, and housing an outlet within the socket so that the outlet is substantially flush with the surface of the plurality of pipe sections. The outlet may include opposing inner and outer convex walls, the inner convex wall conforming to the contour of the socket, and the outer convex wall conforming to the contour of the surface of the plurality of pipe sections. In some embodiments, the method may further comprise the step of forming an abutment region and a spaced region between the pipe section and the mount assembly. The mount assembly may include an upper bracket having depending arms with projections that each extend inwardly and upwardly to engage the pipe section in a notch on the pipe section. In some embodiments, the method may include the step of fastening a lower bracket to the depending arms of the upper bracket via fasteners that partially extend into the spaced region between the pipe section and the mount assembly.

Additional aspects, advantages, and utilities of the present invention will be set forth in part in the description which follows and, in part, will be obvious from the description, or may be learned by practice of the general invention.

BRIEF DESCRIPTION OF THE DRAWING FIGURES

Embodiments of the present invention are described in detail below with reference to the attached drawing figures, wherein.

Figure 1:
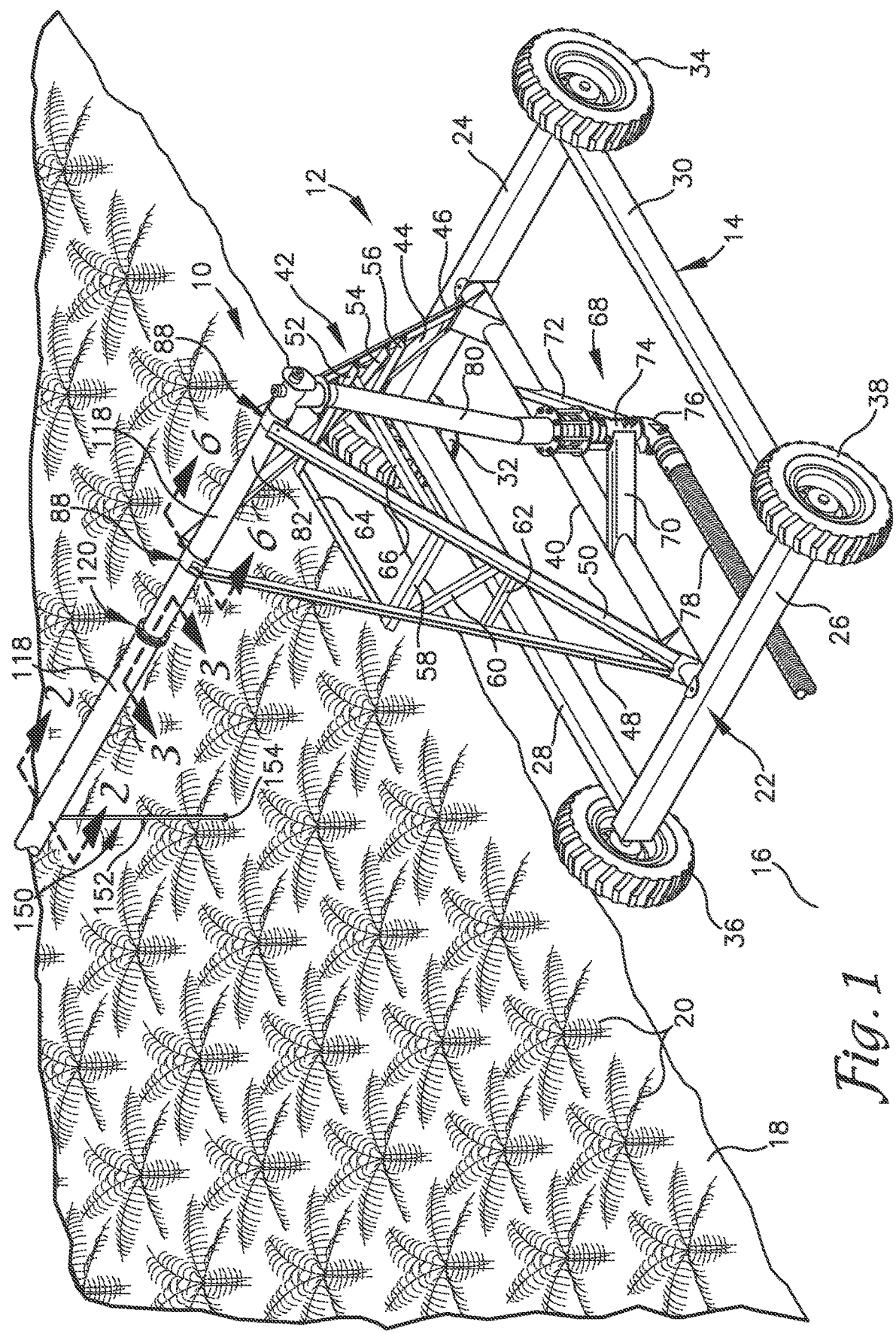
FIG. 1 is a perspective view of an irrigation pipe in accordance with an exemplary embodiment of the present invention, illustrating the irrigation pipe having a plurality of components and connected to a lateral-move overhead sprinkler network type system.

The drawing figures do not limit the present invention to the specific embodiments disclosed and described herein. The drawings are not necessarily to scale, emphasis instead being placed upon clearly illustrating the principles of the illustrated embodiment.

DETAILED DESCRIPTION OF THE EXEMPLARY EMBODIMENT

The present invention is susceptible of embodiment in many forms. While the drawings illustrate, and the specification describes, certain embodiments of the invention, it is to be understood that such disclosure is by way of example only. The principles of the present invention are not limited to the particular disclosed embodiments.

With initial reference to FIG. 1, an irrigation pipe assembly 10 is illustrated in use with an overhead sprinkler network type system in the form of a lateral-move system 12. It is foreseen that the irrigation pipe assembly 10 may be used with other types of overhead sprinkler network type systems, such as but not limited to center-pivot systems, without deviating from the scope of the present invention.

The lateral-move system 12 includes a generally rectangular traveling cart 14 that is operable to traverse up and down a cart path 16 located adjacent to a field 18 with crops 20 to be irrigated. The cart 14 is formed by a rectangular steel or other suitable material (e.g., aluminum) frame assembly 22 that includes parallel front and rear rails 24, 26 connected by parallel left and right side rails 28, 30 that are welded, bolted, or otherwise connected together. The front and rear rails 24, 26 are respectively connected to a pair of front wheels 32, 34 and a pair of rear wheels 36, 38.

Running parallel to and between the side rails 28, 30 is a middle rail 40 that is connected to and supported by the front and rear rails 24, 26 via welding or other suitable means for attachment (e.g., bolting). The middle rail 40 increases the structural integrity of the cart 14 and provides support for a triangular tower assembly 42.

The irrigation pipe assembly 10 is supported overhead with respect to the cart 12 and the field 18 via the tower assembly 42 and a plurality of truss sections (not illustrated) that are each secured to a mobile tower (not illustrated). Details of exemplary truss sections and mobile towers are shown in U.S. Pat. Nos. 4,549,694 and 7,311,275, which are hereby incorporated in their entireties by reference.

The tower assembly 42 connect to the irrigation pipe assembly 10 via a pair of front support members 44, 46 and a pair of rear support members 48, 50 that connect the irrigation pipe assembly 10 to the middle rail 40 so that the irrigation pipe assembly 10 is secured overhead with respect to the cart 14. The front support members 44, 46 and rear support members 48, 50 are connected to the irrigation pipe assembly 10 at upper ends thereof that are spaced from each other, and are connected to the middle rail 40 at a common lower end thereof to form a triangular configuration. In this manner, the support members 44, 46, 48, 50 extend downwardly from the irrigation pipe assembly 10 to converge at points along the middle rail 40 that are adjacent to front and rear rails 24, 26 to secure the irrigation pipe assembly 10 therebetween and overhead with respect to the cart 14.

Each of the front support members 44, 46, and rear support members 48, 50 have cross members 52, 54, 56, and 58, 60, 62 that extend respectively therebetween to increase the structural integrity of the tower assembly 42. As illustrated in FIG. 1, cross members 52, 56, 58, 62 extend generally horizontal and cross members 54, 60 extend generally diagonal between the front support members 44, 46 and rear support members 48, 50. Additionally, cross members 62, 64 extend generally horizontal between the front support members 44, 46 and rear support members 48, 50. In the exemplary embodiment, the cross members 52, 54, 56, 58, 60, 62, 64, 66 are connected to the front support members 44, 46 and rear support members 48, 50 via screws with lock nuts (not illustrated). Any means for attachment including welding could be used to connect the cross members 52, 54, 56, 58, 60, 62, 64, 66 to the support members 44, 46, 48, 50 without departing from the scope of the present invention.

The frame assembly 22 of the cart 14 could assume a number of configurations without departing from the scope of the present invention. For example, the wheels 32, 34 and wheels 36, 38 may be respectively connected to side rails 28, 30 and/or the middle rail 40 may be connected to side rails 28, 30 so that middle rail 40 runs parallel to front and rear rails 24, 26 without departing from the scope of the present invention.

On an underside of the irrigation pipe assembly 10 and in communication therewith is a hose attachment assembly 68 that is secured to the middle rail 40 by arms 70, 72, as illustrated in FIG. 1. The arms 70, 72 extend substantially horizontally from the middle rail 40 and connect to the hose-attachment assembly 105 at an arm-engagement region 74.

Below the arm-engagement region 74 is a swiveling elbow coupler 76 that is angled downward with respect a horizontal plane defined by the frame 30 at an angle of approximately fifteen to forty-five degrees to facilitate swiveling of the coupler 76 when it is subjected to a force. Connected to the coupler 76 is a fluid-transmission hose 78 that is operable to connect the lateral-move system 12 to a fluid source (not illustrated). The fluid source may be a well, pond, water tank, chemical tank, and/or other like source of fluids and/or solids suspended in fluids including fertilizers and pesticides ("fluids") and are deliverable to the crops 20 in the field 18 via the irrigation-pipe assembly 10 that receives the fluids from the lateral-move system 12. The hose attachment assembly 68 is operable to communicate fluid from the hose 78 to the irrigation pipe assembly 10 through a substantially vertical riser conduit 80.

Figure 2:
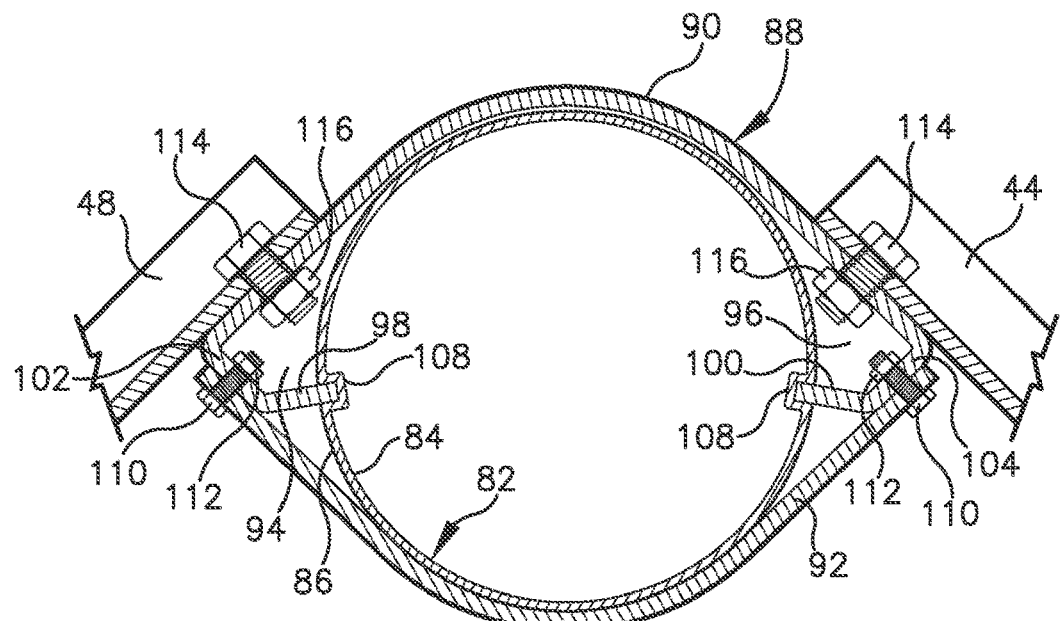
FIG. 2 is a front cross-sectional view of the irrigation pipe illustrated in FIG. 1, illustrating a mount assembly on the irrigation pipe.

The irrigation pipe assembly 10 includes a distribution pipe 82 that is connected to the vertical riser conduit 80 and extends outwardly from the cart 14 in a lateral direction thereto. In the exemplary embodiment, the distribution pipe 82 has a primary layer 84 in the form of carbon steel and has a protective coating 86 in the form of a galvanized and/or painted layer to increase durability of the primary layer 84, as illustrated in FIG. 2. It is foreseen, however, that the distribution pipe 44 could be made of stainless steel, aluminum, or the like with or without a coating such as a galvanized and/or painted layer.

Figure 3:
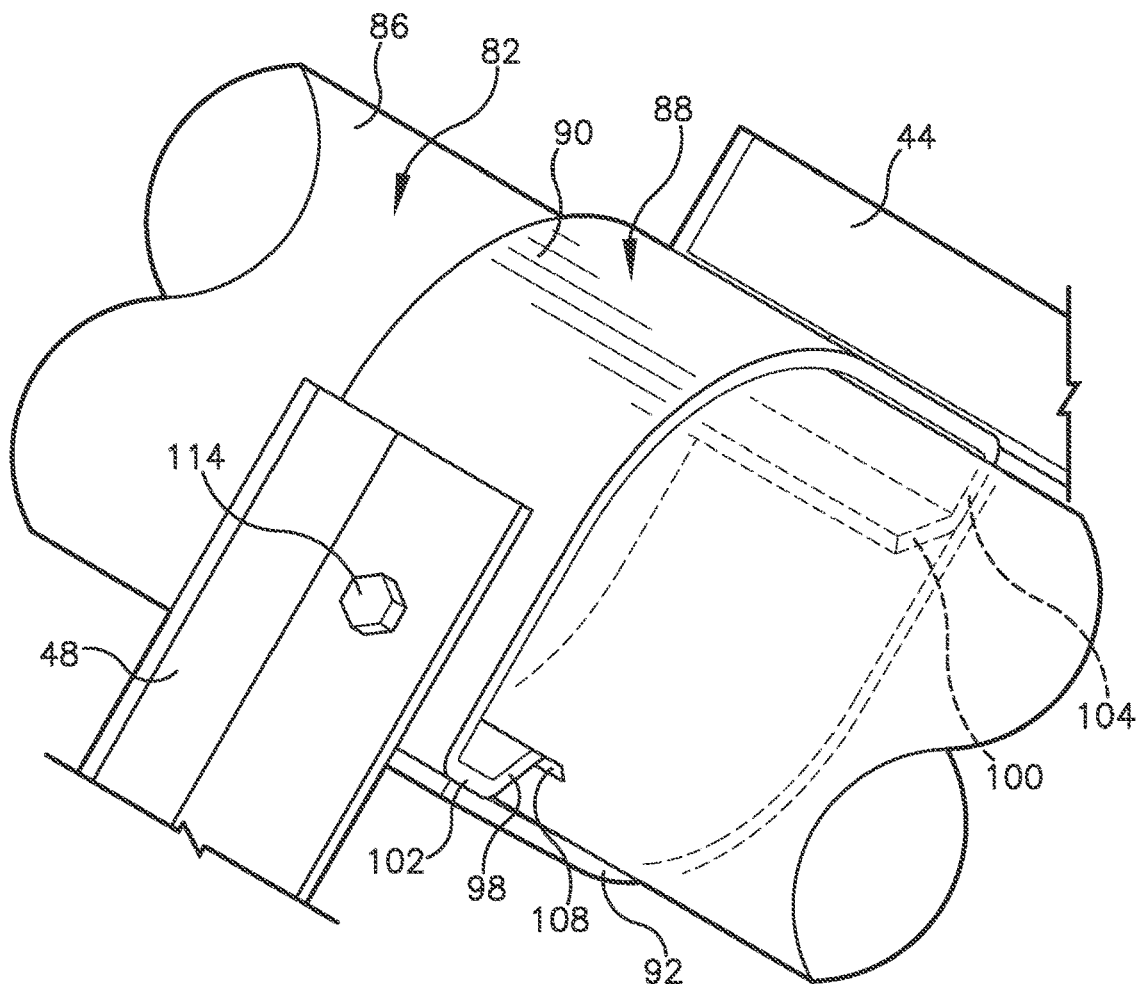
FIG. 3 is a perspective view of the irrigation pipe illustrated in FIG. 1, illustrating a mount assembly on the irrigation pipe.
Figure 4:
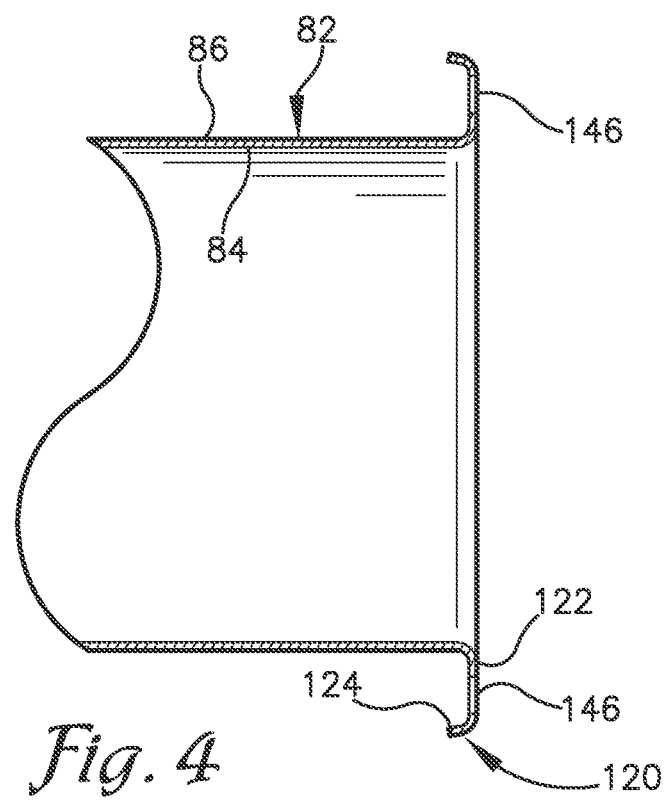
FIG. 4 is a side cross-sectional view of the irrigation pipe illustrated in FIG. 1, illustrating a flange of a section of the irrigation pipe.
Figure 5:
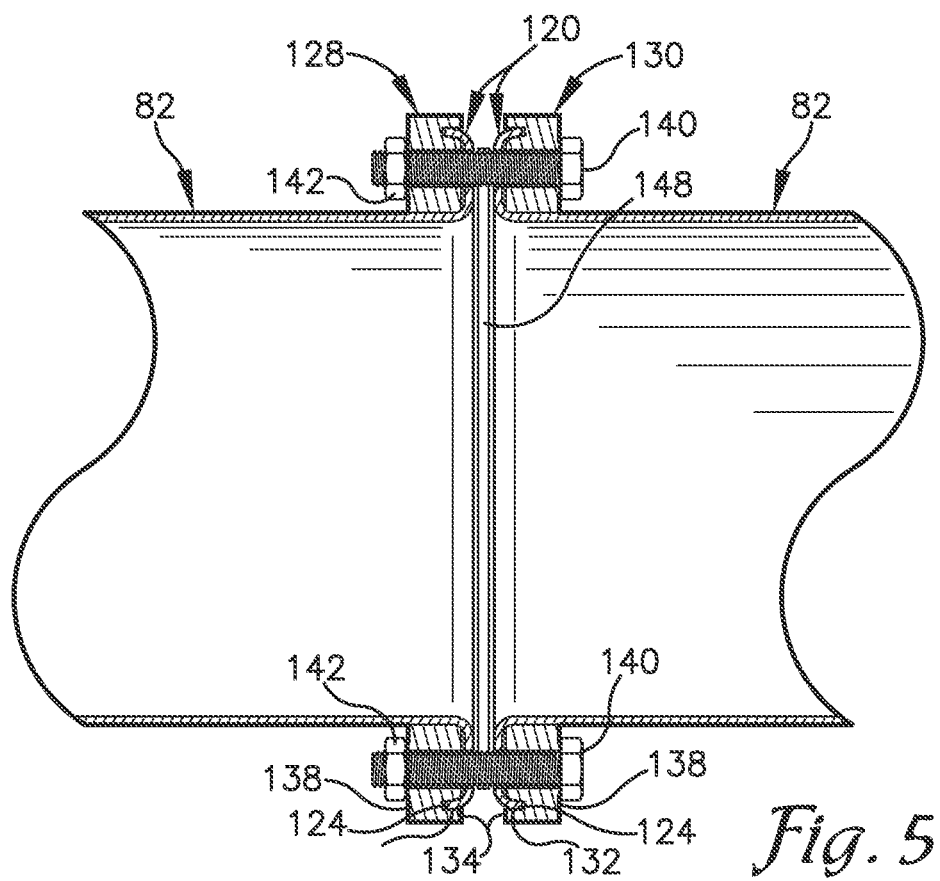
FIG. 5 is a side cross-sectional view of the irrigation pipe illustrated in FIG. 1, illustrating a flange assembly adjoining two sections of the irrigation pipe.
Figure 6:
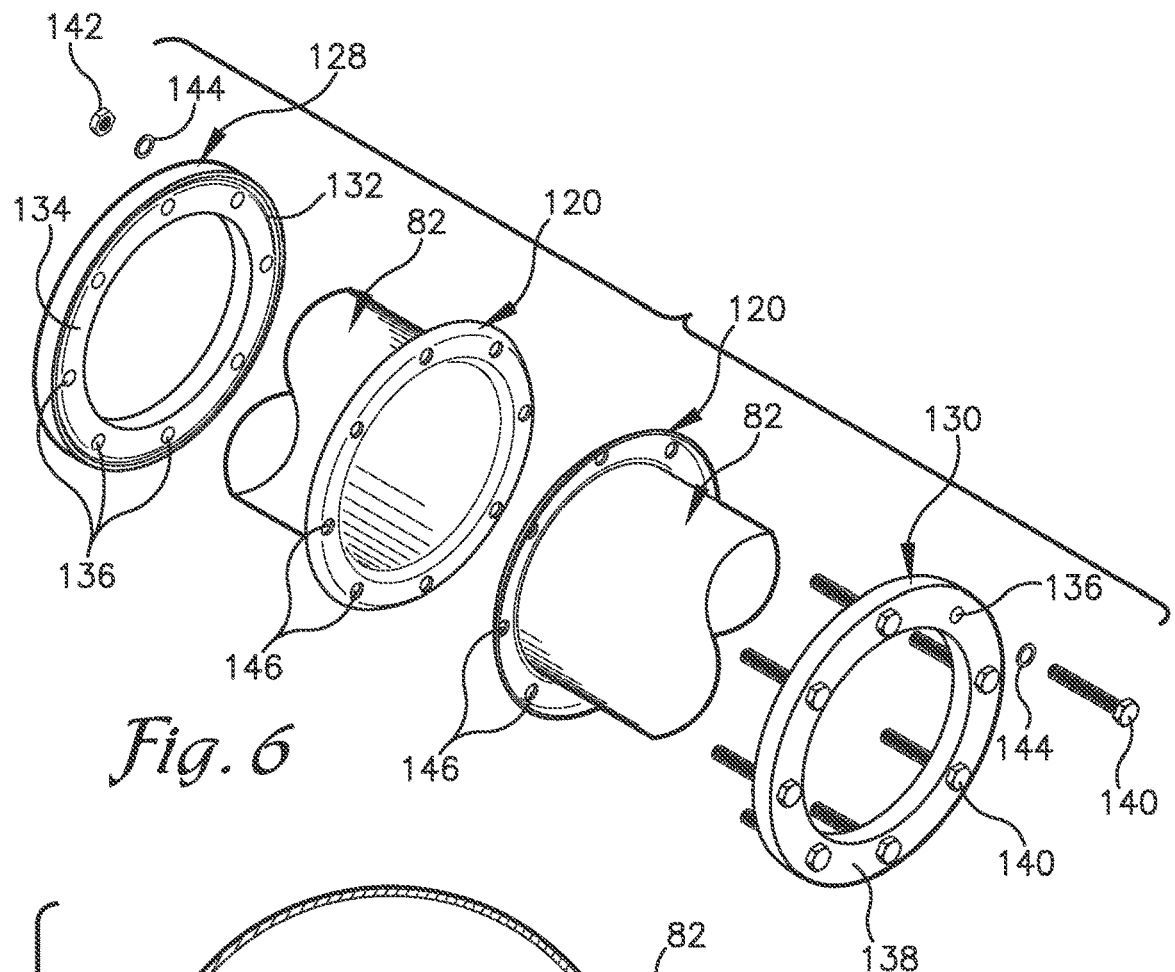
FIG. 6 is a perspective, exploded view of the irrigation pipe illustrated in FIG. 1, a flange assembly and two sections of the irrigation pipe.

As previously discussed, the tower assembly 42 and the truss sections (not illustrated) respectively support the irrigation pipe assembly 10 overhead with respect to the cart 14 and field 18. To connect the tower assembly 42 and truss sections (not illustrated) to the irrigation pipe assembly 10, a plurality of attachment points are provided along the distribution pipe 82 via mount assemblies 88 that are secured to the distribution pipe 82 during fabrication thereof, as illustrated by FIGS. 1-3. The number of mount assemblies 88 and truss sections (not illustrated) are determined by the length of the distribution pipe 82 and support required to elevate the irrigation pipe assembly 10 over the field 18. As illustrated with the tower assembly 42, the support members 44, 46, 48, 50 connect to each mount assembly 88 at two points of attachment along the distribution pipe 82.

The mount assembly 88 includes upper and lower brackets 90, 92 that are operable to sandwich a portion of the distribution pipe 82 therebetween while forming fastener compartments 94, 96 on either side of the distribution pipe 82. The upper bracket 90 includes inward projections 98, 100 on either end of the bracket that project at an upward angle from arms 102, 104 that depend from the upper bracket 90. The projections 98, 100 are sized and shaped to be respectively received within notches 102, 104 formed in the distribution pipe 82. The notches 102, 104 may be round, oval, square, or rectangular, and be of a plurality so that each of the projections 98, 100 engage a plurality of notches 102, 104 on the distribution pipe 82 thereby increasing the strength of the mount assembly 88.

In the exemplary embodiment, the arms 102, 104 respectively depend from the upper bracket 90 at ninety degrees thereto and the projections 98, 100 respectively project from the arms 102, 104 at forty-five degrees thereto so that the projections 98, 100 are angled slightly upward from horizontal (e.g. five to ten degrees from horizontal), as illustrated in FIG. 2. In this manner, the distribution pipe 82 is biased or nested via gravity into abutting engagement with the projections 98, 100 and the upper bracket 90 is operable to points of attachment thereon. It is foreseen that the angles between the upper bracket 90, the arms 102, 104, and/or the projections 98, 100 could be varied without deviating from the scope of the present invention.

In the exemplary embodiment, the notches 106, 108 are formed during fabrication of the irrigation pipe assembly 10 by a punch that presses the projections 98, 100 of the upper bracket 90 into the distribution pipe 82 in an upward direction from horizontal, (e.g. five to ten degrees from horizontal), as illustrated in FIG. 2, without damaging the protective coating 86. For instance, the pressing equipment sold under the TOG-L-LOC® trademark of BTM Corporation and related process may be employed in fabrication of the present invention to form round notches 106, 108 on the distribution pipe 82. It is foreseen, however, that any like process could be used to form the notches 106, 108 without deviating from the scope of the present invention.

In the exemplary embodiment, the lower bracket 92 is fastened to the upper bracket 90 via a plurality of fasteners in the form of a bolt 110 and nut 112 so that the distribution pipe 82 is braced between the upper and lower brackets 90, 92 and the mount assembly 88 is secured in place along the distribution pipe 82. The nut 112 of each of the plurality of fasteners is housed in each compartment 94, 96 and may include a cap (not illustrated) affixed to the exposed end of the bolt 110 so as not to damage the protective coating 86 of the distribution pipe 82 during installation thereof. It is foreseen that the upper and lower brackets 90, 92 could be fastened together via any like means (e.g., screws, welding, gluing, and the like), without deviating from the scope of the present invention. Thus, the upper and lower brackets 90, 92 are operable to indirectly and directly support the distribution pipe 82, respectively, without damaging the protective coating 86 of the distribution pipe 82 by welding, drilling, or the like.

The mount assembly 88, and particularly, the upper bracket 90 is fastened to the support members 44, 48 and 46, 50 via a plurality of fasteners in the form of a bolt 114 and a nut 116. The nut 116 of each of the plurality of fasteners is housed in each compartment 94, 96 so as not to damage the protective coating 86 of the distribution pipe 82 during installation thereof. The support members 44, 48 and 46, 50 are fastened to the upper bracket 90 at a location above the center-line of the distribution pipe 82 to provide increased stability and distribute the weight of the distribution pipe 82 evenly across the support members 44, 48 and 46, 50. Additionally, the location of attachment enables the projections 98, 100 and the arms 102, 104 to be connected at forty-five degrees; the benefits of such discussed previously. It is foreseen that the upper bracket 90 may have threaded apertures with a thread-lock agent pre-applied thereto to receive and secure each of the bolts 114 in the upper bracket 90.

Because the mount assembly 88 is not connected to the distribution pipe 82 via welding and/or drilling, is it relatively easy to remove the mount assembly 88 from the distribution pipe 82. Thus, if replacement of the mount assembly 88 is required, (e.g., if the mount assembly 88 becomes damaged), such replacement may be easily accomplished in the field 18. It is foreseen that the mounting assembly 88 could be used at any point of engagement between the distribution pipe 82 and a support, for example, a truss section (not illustrated), so as not to damage the protective coating 86 of the distribution pipe 82 via welding, drilling, or the like.

Turning now to FIGS. 1 and 4-6, the irrigation pipe assembly 10 includes a plurality of sections 118. The number of sections 118 depend on a size of the field 18 to be irrigated with larger fields requiring more sections 118. Each end of each section 118 has a flange 120 with a flange face 122 that is oriented at ninety degrees to a length of the distribution pipe 82 and a flange end 124 that curves to be approximately parallel to the length of the distribution pipe 82 to strengthen the flange 120. Each flange 120 is operable to be joined together by a flange-protection assembly 126.

The flange-protection assembly 126 includes opposing flange plates 128, 130 that form the flange-protection assembly 126. The opposing flange plates 128, 130 are sized and shaped to sandwich and substantially enclose adjoining flanges 120. Each of the opposing flange plates 128, 130 have a circumferential groove 132 on an inner abutment surface 134 thereof and a plurality of apertures 136 that extend from the inner surface 134 to an outer surface 136 of the opposing flange plates 128, 130. The inner surface 134 and circumferential groove 132 are sized and shaped to respectively abut the flange 120 and receive the flange end 124.

During fabrication of the irrigation pipe assembly 110, the opposing flange plates 128, 130 are slidably mounted on each section 118 that are aligned with each flange face 122 abutting the other. The opposing flange plates 128, 130 are then connected via a plurality of fasteners in the form of a bolt 140, nut 142, and washers 144. Each fastener extends through each aperture 134 of the opposing flange plates 128, 130 and through apertures 146 punched through the flange face 122 of each section 118. Each fastener is then tightened to secure the opposing flange plates 128, 130 and ultimately each section 118 together to form a water-tight fit. Because the apertures 146 are punched instead of, for example, drilled, the size of the apertures 146 can be made with more precise specifications rather than providing larger apertures 146 having a tolerance that accounts for an increase in size due to, for example galvanizing or painting that would be required if the apertures 146 were drilled. In the exemplary embodiment, a flat ribbed gasket 148 is positioned between each section 118 to ensure that a water-tight fit is formed.

Figure 7:
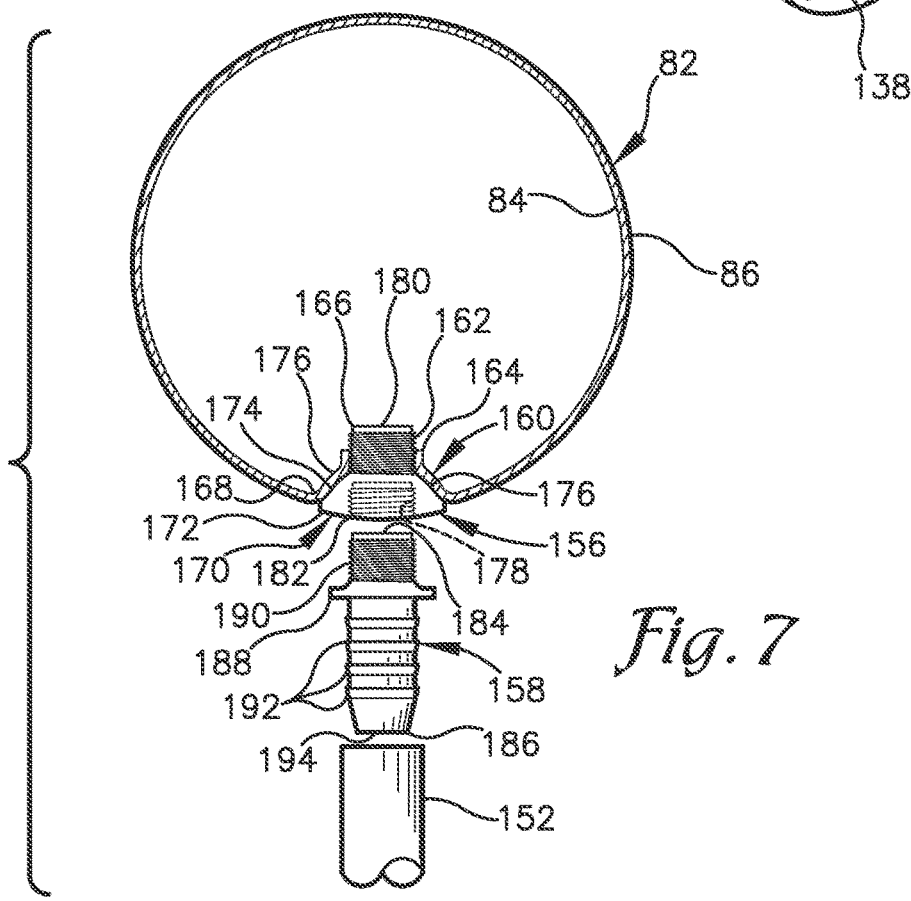
FIG. 7 is a front cross-sectional view of the irrigation pipe illustrated in FIG. 1, illustrating a connector and a socket adapter in a socket of the irrigation pipe.

Turning now to FIGS. 1 and 7, each section 118 of the distribution pipe 82 may have one or more sprinklers 150 located therealong, e.g., every ten feet, to communicate fluid to the crops 9 from a height above the crops 20, e.g., three feet. Each sprinkler 150 includes an elongated hose 152 with a sprinkler head 154 on an end thereof. The sprinkler head 154 is operable to distribute the fluid onto the crops 20 from above and control a pressure of fluid in the hose 152. The hose 152 attaches to the distribution pipe 82 at the other end opposite to the sprinkler head 154 via a fluid outlet in the form of a socket adapter 156 and a connector 158.

The socket adapter 156 nests entirely or almost entirely within a recessed socket 160 in the distribution pipe 82 to provide a low-profile assembly that is not easily damaged and is easy to replace if it becomes damaged. The socket adapter 156 has a threaded male end 162 that is sized and shaped to mate with a corresponding threaded surface 164 of the recessed socket 160 to provide a secure, water-tight seal therebetween. The threaded male end 162 extends upwardly toward the center of the distribution pipe 82 so that a fluid inlet 166 of the threaded male end 162 is elevated from a bottom 168 of the distribution pipe 82. In this manner, any sediment, (e.g., dirt, debris, or the like in the fluid and/or on the bottom 168 of the distribution pipe 82 that is biased toward the bottom 168 via gravity), is unable to enter the socket adapter 166 and the likelihood of a clog developing in the socket adapter 166 is decreased. It is foreseen that a serrated pattern (not illustrated) could be included on the threaded male end 162 of the socket adapter 156 and/or the threaded surface 164 of the recessed socket 160 to bite into its opposing surface and/or mate with one or more opposing matching serrations so that the socket adapter 156 is locked in the recessed socket 160 and incidental separation of the socket adapter 156 from the recessed socket 160 is prevented.

The socket adapter 156 has a female end 170 opposite to the threaded male end 162 with opposing outer and inner convex surfaces 172, 174. The inner convex surface 174 is contoured so that the socket adapter 156 is operable to abut a corresponding concave surface 176 of the recessed socket 160 when the socket adapter 156 is secured thereto. The female end 170 has a threaded cavity 178 that is sized and shaped to partially receive the connector 158 therein. The socket adapter 156 has an aperture 180 that extends from the fluid inlet 166 and entirely through a center of the socket adapter 156 to a fluid outlet 182 to enable communication of fluid from the distribution pipe 82 therethrough.

The connector 158 has a fluid inlet end 184 that extends into the socket adapter 156 and a fluid outlet end 186 that extends into the hose 152. The fluid inlet and outlet ends 184, 186 are externally divided by a ring 188 and internally connected by an aperture 194 that extends from the fluid inlet and outlet ends 206, 208 to enable communication of fluid from the distribution pipe 82 therethrough. The inlet end 184 has a threaded surface 190 that is sized and shaped to securely mate with the threaded surface 178 of the adapter 156. The outlet end 186 has a plurality of circumferential barbs 192 along the outlet end 186 that are operable to abut an internal surface (not illustrated) of the hose 152 and ensure a secure, water-tight seal therebetween. The connector 158 is removable from the adapter 156 to facilitate easy installation and/or replacement of each sprinkler 150 in the field 18. In this manner, the connector 158 and adapter 156 are operable to removably secure the hose 152 to the recessed socket 160 and ultimately to the distribution pipe 82.

During fabrication of the irrigation pipe assembly 10, the recessed socket 160 with its threaded and concave surfaces 164, 176 is formed by cold forming a depression at the bottom 168 of the distribution pipe 82. In this manner, the protective coating 86 of the distribution pipe 82 is not damaged. It is foreseen, however, that the recessed socket 160 may be formed by other like processes.

Upon formation of the recessed socket 160, the threaded male end 162 of the adapter 156 is threaded to the threaded surface 164 of the recessed socket 160 until the convex surface 174 of the adapter 156 abuts the concave surface 176 of the recessed socket 160 and a water-tight seal is formed. A sealant layer (not illustrated) may be added between the threaded male end 162 and the threaded surface 164 of the recessed socket 160 to ensure formation of the water-tight seal.

Figure 8:
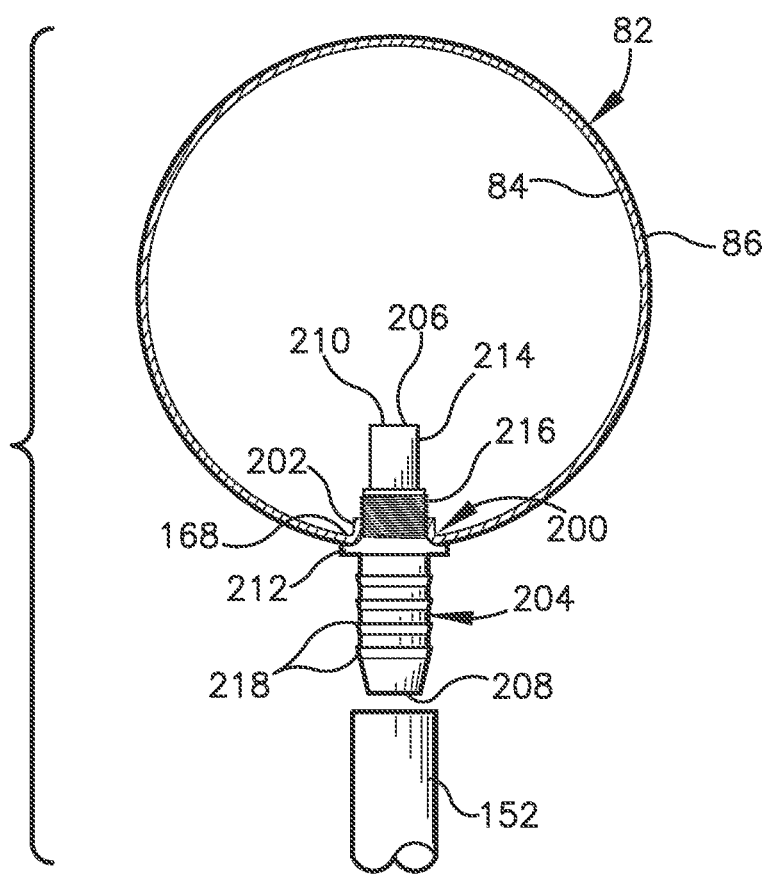
FIG. 8 is a front cross-sectional view of the irrigation pipe illustrated in FIG. 1, illustrating a connector in a socket of the irrigation pipe.

It is foreseen that the fluid outlet may be in the form of a flush socket 200, as illustrated in FIG. 8, in addition to or instead of the recessed socket 160. The flush socket 200 is formed in the distribution pipe 82 with an inwardly-projecting threaded lip 202. A connector 204 is provided with a fluid inlet end 206 that extends into the flush socket 200 and a fluid outlet end 208 that extends into the hose 152. The fluid inlet and outlet ends 206, 208 are connected internally by an aperture 210 that extends from the fluid inlet and outlet ends 206, 208 to enable communication of fluid from the distribution pipe 82 therethrough and divided by an external ring or divider 212.

The fluid inlet end 206 has a smooth and a threaded surface 214, 216 to respectively prevent clogs and provide a secure, water-tight seal between the connector 204 and the flush socket 200 of the distribution pipe 82. The smooth surface 214 extends upward from the threaded surface 216 and the bottom 168 of the distribution pipe 82 toward the center of the distribution pipe 82 so that the aperture 210 on the fluid inlet end 206 is elevated from the bottom 168. In this manner, any sediment (e.g., dirt, debris, or the like in the fluid and/or on the bottom 168 of the distribution pipe 82) that is biased toward the bottom 168 via gravity is unable to enter the connector 204 and the likelihood of a clog developing therein is decreased.

The threaded male surface 216 of the fluid inlet end 206 is sized and shaped to mate with the threaded lip 202 of the flush socket 200 with the divider 212 abutting the protective coating 86 of the distribution pipe 82 to provide a secure, water-tight seal therebetween. It is foreseen that a serrated pattern (not illustrated) could be included on the threaded male end 216 of the connector 204 and/or the threaded lip 202 of the flush socket 200 to bite into its opposing surface and/or mate with one or more opposing matching serrations so that the connector 204 is locked in the flush socket 200 and incidental separation of the connector 204 from the flush socket 200 is prevented.

The fluid outlet end 208 has a plurality of circumferential barbs 218 along the fluid outlet end 208 to securely mate with and abut an internal surface (not illustrated) of the hose 152. The connector 204 is removable from the flush socket 200 to facilitate easy installation and/or replacement of each sprinkler 150 in the field 18. In this manner, the connector 204 is operable to removably secure the hose 152 to the flush socket 200 and ultimately to the distribution pipe 82.

During fabrication of the irrigation pipe assembly 10 with the flush socket 200, the flush socket 200 with its threaded lip 202 is formed in the distribution pipe 82 by cold forming so that the protective coating 86 of the distribution pipe 82 is not damaged. It is foreseen, however, that the flush socket 200 may be formed by other similar methods. Upon formation of the flush socket 200, the fluid inlet end 206 of the connector 204 is inserted into the flush socket 200. The smooth surface 214 has a diameter that is less than that of the flush socket 200, and facilitates slidable insertion of the connector 204. At the transition between the smooth and a threaded surface 214, 216, the connector 204 is threaded into the flush socket 200 until the protective coating 86 of the distribution pipe 82 abuts the divider 212, as illustrated in FIG. 8. In this manner, a secure, water-tight seal is formed between the flush socket 200 and the connector 204.

The embodiments of the present invention described above are to be used as illustration only, and should not be utilized in a limiting sense in interpreting the scope of the present invention. Obvious modifications to the embodiments, as hereinabove set forth, could be readily made by those skilled in the art without departing from the spirit of the present invention. For instance, those skilled in the art will appreciate that the principles of the present invention are not limited to use with a lateral-move irrigation system, but may be employed with other types of irrigation systems.

The inventors hereby state their intent to rely on the Doctrine of Equivalents to determine and assess the reasonably fair scope of the present invention as pertains to any apparatus not materially departing from but outside the literal scope of the present invention as set forth in the following claims.

What is claimed is:

1. An irrigation pipe assembly configured to brace an irrigation pipe, the irrigation pipe assembly comprising:
   a pipe section having an outer surface including first and second notches; and
   a mount assembly comprising:
      an upper bracket including first and second downward and inward extending arms and first and second projections extending upward and inward from the first and second arms, the first and second projections being configured to engage the first and second notches of the pipe section; and
      a lower bracket configured to be fastened to the first and second arms of the upper bracket so as to brace the pipe section between the upper bracket and the lower bracket.

2. The irrigation pipe assembly of claim 1, the upper bracket and the lower bracket being bent flatbar material.

3. The irrigation pipe assembly of claim 1, the notch being an elongated slot.

4. The irrigation pipe assembly of claim 1, the upper bracket including a central section having a curved middle portion and two opposing straight portions extending downward and outward from the curved middle portion.

5. The irrigation pipe assembly of claim 4, the first and second arms depending ninety degrees from the opposing straight portions.

6. The irrigation pipe assembly of claim 1, the projections extending upward between five to ten degrees from horizontal.

7. The irrigation pipe assembly of claim 1, the lower bracket having a curved middle portion and first and second opposing straight portions, the first and second opposing straight portions of the lower bracket being configured to abut the first and second arms of the upper bracket.

8. The irrigation pipe assembly of claim 7, the first and second opposing straight portions of the lower bracket and the first and second arms of the upper bracket having corresponding fastener holes for attaching the lower bracket to the upper bracket via fasteners positioned in the fastener holes.

9. The irrigation pipe assembly of claim 1, the arms of the upper bracket being configured to abut support members of a tower assembly.

10. The irrigation pipe assembly of claim 9, the arms of the upper bracket having fastener holes for attaching the upper bracket to the support members via fasteners positioned in the fastener holes of the arms of the upper bracket.

11. A movable overhead irrigation system comprising:
    a plurality of spaced apart mobile towers each including a plurality of wheels for traversing a field and opposing vertically extending support members;
    a plurality of irrigation pipe assemblies each including:
       a pipe section extending between adjacent mobile towers, the pipe section having an outer surface including first and second notches; and
       a mount assembly comprising:
          an upper bracket including first and second downward and inward extending arms and first and second projections extending upward and inward from the first and second arms, the first and second projections being configured to engage the first and second notches of the pipe section; and
          a lower bracket configured to be fastened to the first and second arms of the upper bracket so as to brace the pipe section between the upper bracket and the lower bracket,
       the upper bracket being configured to be attached to the vertically extending support members so that the pipe section is elevated and supported by one of the plurality of mobile towers via the mount assembly.

12. The movable overhead irrigation system of claim 11, the upper bracket and the lower bracket being bent flatbar material.

13. The movable overhead irrigation system of claim 11, the notch being an elongated slot.

14. The movable overhead irrigation system of claim 11, the upper bracket including a central section having a curved middle portion and two opposing straight portions extending downward and outward from the curved middle portion.

15. The movable overhead irrigation system of claim 11, the first and second arms depending ninety degrees from the opposing straight portions.

16. The movable overhead irrigation system of claim 11, the projections extending upward between five to ten degrees from horizontal.

17. The movable overhead irrigation system of claim 11, the lower bracket having a curved middle portion and first and second opposing straight portions, the first and second opposing straight portions of the lower bracket being configured to abut the first and second arms of the upper bracket.

18. The movable overhead irrigation system of claim 17, the first and second opposing straight portions of the lower bracket and the first and second arms of the upper bracket having corresponding fastener holes for attachment via fasteners positioned in the corresponding fastener holes.

19. The movable overhead irrigation system of claim 11, the arms of the upper bracket being configured to abut the support members and having fastener holes for attachment to the support members via fasteners positioned in the fastener holes of the arms of the upper bracket.

20. A lateral move irrigation cart comprising:
    a frame assembly comprising:
       a frame including a plurality of rails;
       a plurality of wheels rotatably connected to the frame for traversing a field;
       first and second sets of opposing support members extending vertically from the plurality of rails;
       a vertical riser conduit attached to one of the plurality of rails and one of the support members;
       a hose coupler pivotably connected to the vertical riser conduit and configured to be attached to a hose;
    a plurality of irrigation pipe assemblies each comprising:
       a portion of a pipe having an outer surface including first and second notches; and
       a mount assembly comprising:
          an upper bracket including first and second downward and inward extending arms and first and second projections extending upward and inward from the first and second arms, the first and second projections being configured to engage the first and second notches of the pipe section; and a lower bracket configured to be fastened to the first and second arms of the upper bracket so as to brace the pipe section between the upper bracket and the lower bracket, the upper bracket being configured to be attached to opposing support members so that the portion of the pipe is elevated and supported by the frame assembly via the mount assembly.

\* \* \* \* \*